V. A. FYNN.
DYNAMO ELECTRIC MACHINE.
APPLICATION FILED JUNE 19, 1911.
1,118,928.
Patented Dec. 1, 1914.
3 SHEETS—SHEET 1.
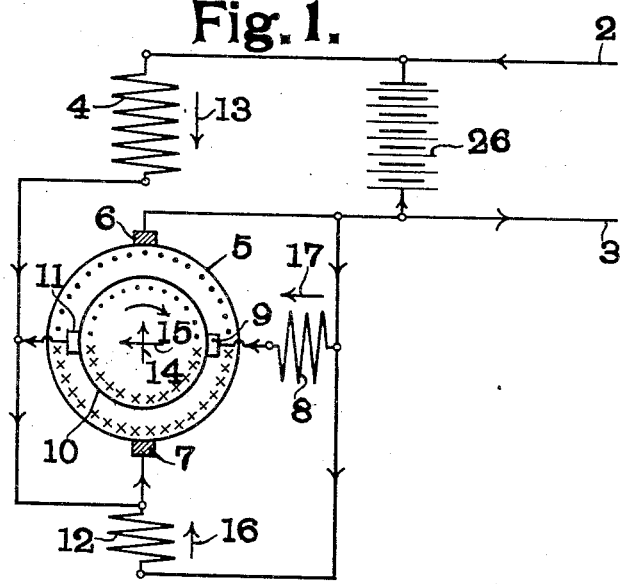
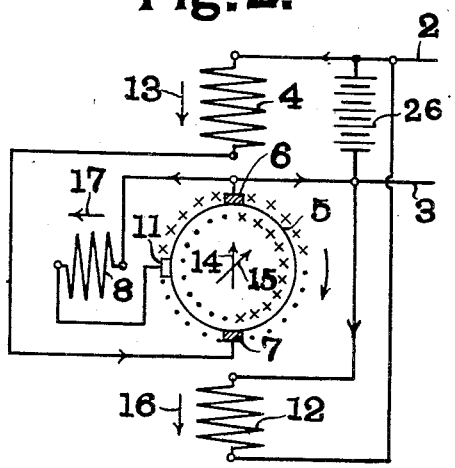
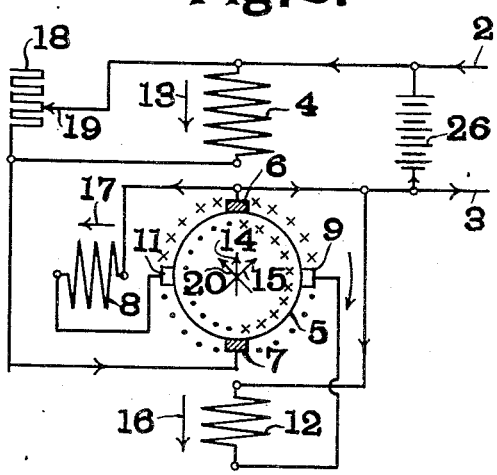
WITNESSES:
L. L. Mead
W. H. Alexander
INVENTOR
Valère A. Fynn,
BY E. E. Huffman
ATTORNEY

V. A. FYNN.
DYNAMO ELECTRIC MACHINE.
APPLICATION FILED JUNE 19, 1911.

1,118,928.

Patented Dec. 1, 1914.
3 SHEETS—SHEET 2.

WITNESSES:
L. L. Mead
W. H. Alexander

INVENTOR
Valère A. Fynn
E. E. Huffman
ATTORNEY

V. A. FYNN.
DYNAMO ELECTRIC MACHINE.
APPLICATION FILED JUNE 19, 1911.

1,118,928.

Patented Dec. 1, 1914.

WITNESSES:
L. L. Mead,
W. H. Alexander.

INVENTOR
Valère A. Fynn,
BY E. E. Huffman
ATTORNEY

UNITED STATES PATENT OFFICE.

VALÈRE ALFRED FYNN, OF LONDON, ENGLAND, ASSIGNOR TO WAGNER ELECTRIC MANUFACTURING COMPANY, OF ST. LOUIS, MISSOURI, A CORPORATION OF MISSOURI.

DYNAMO-ELECTRIC MACHINE.

1,118,928.   Specification of Letters Patent.   Patented Dec. 1, 1914.

Application filed June 19, 1911. Serial No. 633,980.

*To all whom it may concern:*

Be it known that I, VALÈRE ALFRED FYNN, a subject of the King of England, residing at London, England, have invented a certain new and useful Dynamo-Electric Machine, of which the following is such a full, clear, and exact description as will enable any one skilled in the art to which it appertains to make and use the same, reference being had to the accompanying drawings, forming part of this specification.

My invention relates to dynamo electric machines and more particularly to generators which are required to run at widely varying speeds and to operate in connection with storage batteries.

The object of my invention is to provide a dynamo electric machine in which the effective magnetization shall automatically decrease with increasing speed or with increasing speed and load, thus rendering these generators suitable for charging storage batteries and for similar service.

My invention will be better understood from the following description taken in conjunction with the accompanying diagrammatic drawings of two-pole machines in which—

Figure 4:
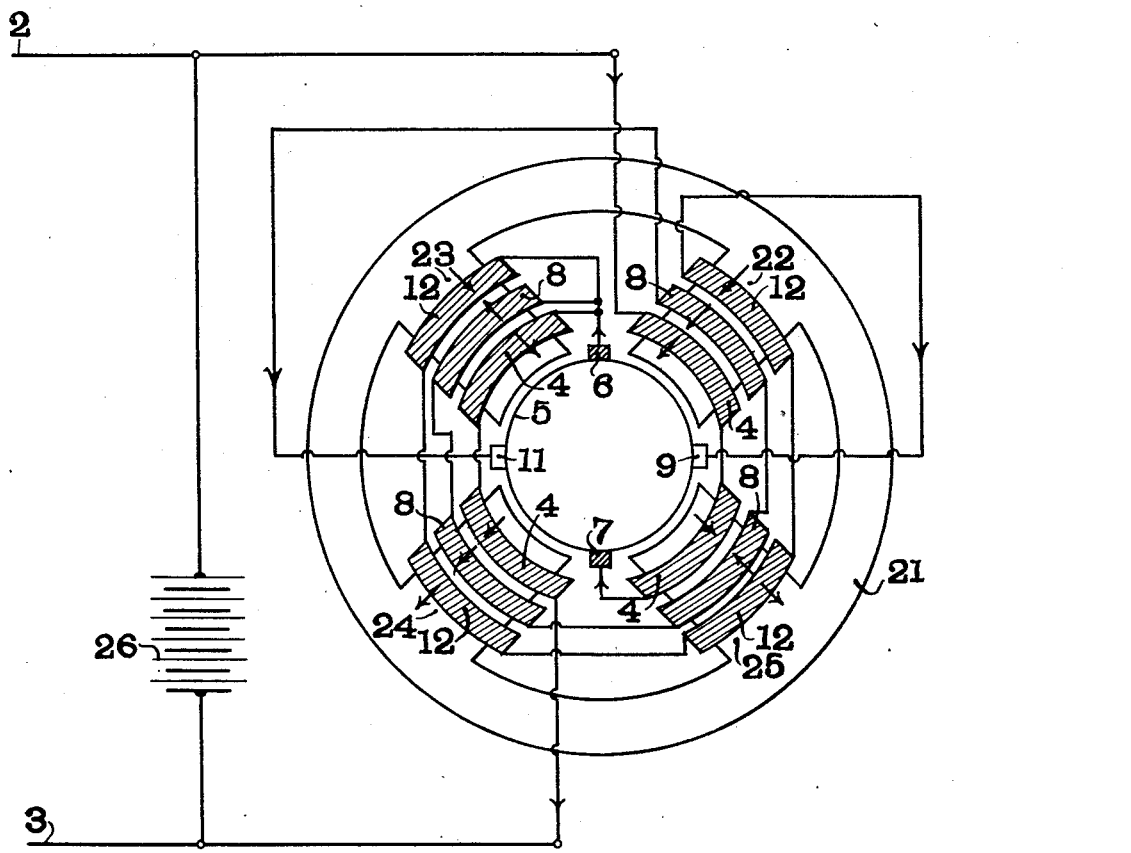
Figure 5:
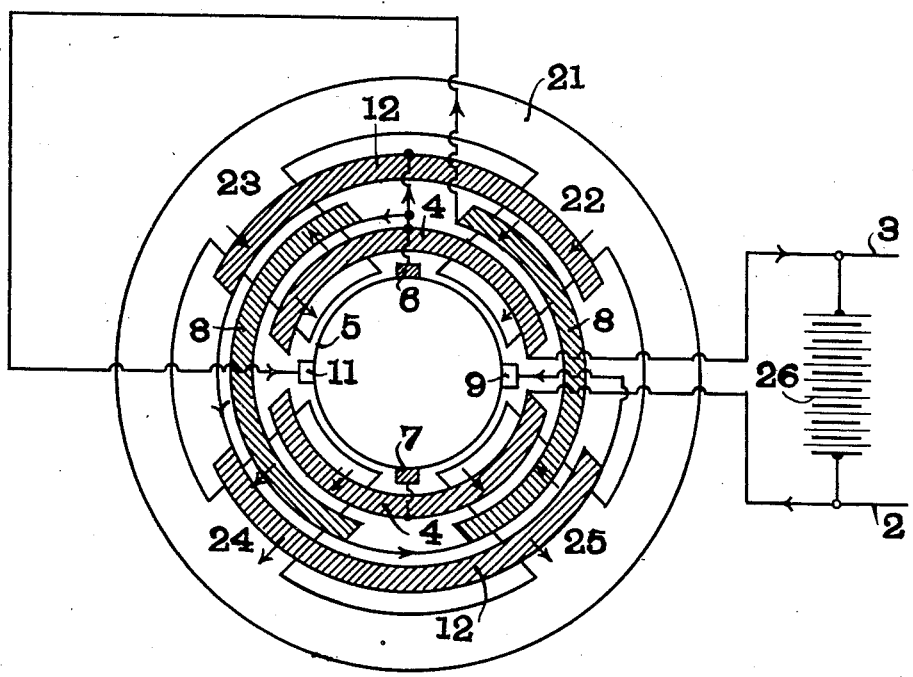

Figure 1 shows one form of my improved dynamo electric machine; Figs. 2 and 3 illustrate modifications of the machine shown in Fig. 1; Figs. 4 and 5 illustrate mechanical embodiments of the form of the machine shown in Fig. 3.

Referring to Fig. 1 the rotor carries two commuted windings 5 and 10 preferably located in the same slots but indicated in the figure, for the sake of convenience, by two circles of unequal diameter. The stator carries a neutralizing winding 4, a main exciting winding 8 and an auxiliary exciting winding 12. Main brushes 6, 7 adapted to coact with the commuted winding 5 are disposed coaxially with the neutralizing winding and are connected in series relation with the latter, and with the mains. The magnetization produced by 4 is therefore proportional to the load current. This magnetization is indicated by the arrow 13. The auxiliary exciting winding 12 is connected across the main brushes, that is in parallel with said brushes or with the mains 2, 3. The magnetization 16 produced by 12 is therefore proportional to the E. M. F. appearing at the main brushes or to the E. M. F. of the mains. Auxiliary brushes 9, 11 adapted to coact with the commuted winding 10 are displaced by ninety electrical degrees from the main brushes and are connected in series with the main exciting winding 8. The winding 8 and the commuted winding 10 connected in series with it are connected across the main brushes 6, 7 which is equivalent to their being connected in parallel to the mains 2, 3. A storage battery 26 is connected across the mains 2, 3.

The operation of the machine is somewhat as follows: Assume the dynamo to be fully neutralized and to be driven at the lowest speed at which it is able to generate an E. M. F. a little greater than the battery E. M. F. thus sending a charging current into said battery, then the direction of the currents in the various windings for a clockwise rotation of the armature will be as indicated by the arrow heads placed on the several conductors connecting said windings.

In a combination comprising a dynamo in parallel with a storage battery it is the storage battery which will determine the voltage at the terminals of the combination and that voltage will vary but little if provision is made for preventing the current delivered by the dynamo from exceeding a certain predetermined value usually chosen equal to the maximum safe charging current which can be sent into the battery. For the purpose of this explanation it will be sufficient to assume that the voltage at the terminals of the combination will actually remain constant it being nevertheless understood that this statement is not strictly accurate. If the voltage at the terminals 2, 3 is constant then the voltage at the main brushes will only differ from the former by the usually small ohmic drop within the neutralizing winding 4 and may roughly be said to be also constant. If the machine is fully neutralized then the neutralizing flux 13 due to 4 is exactly equal to the armature reaction flux 14 and the only flux in the armature or working axis of the machine is the flux 16 due to the auxiliary exciting winding 12. This flux must be practically constant since the voltage at the main brushes 6, 7 has been assumed to be practically constant throughout the operating range of the machine. Now by rotation of the armature conductors of the commuted winding 10 in this flux 16 there will be generated in said conductors E. M. F's directed as indicated by the dots (up) and the crosses (down). The sum of these E. M. F.'s will appear at the brushes 9, 11, this resultant E. M. F. opposing the E. M. F. impressed on these brushes from the mains. Identically distributed E. M. F.'s will be generated in the commuted winding 5 but will not appear at the brushes 6, 7 coacting with 5 because said E. M. F.'s all cancel out with respect to said brushes. The connection between the brushes 11, 9, the winding 8 and the main brushes 6, 7 or the mains 2, 3, is seen to be such that the terminal E. M. F. E opposes the E. M. F. ER generated at the auxiliary brushes 11, 9 by rotation in the auxiliary flux 16. It follows that the main flux 17, which is responsible for the E. M. F. generated in 5 and summed up by the brushes 6, 7, always depends on (E—ER) and of course on the permeability of the machine along the axis 9, 11. Since ER to which I will refer as the speed E. M. F. depends on a practically constant flux 16 and on the number of revolutions of the armature, then it is clear that the main flux 17 will diminish with increasing speed thus helping to keep the voltage generated in 5 and summed by the brushes 6, 7 practically constant thereby limiting the output of the dynamo irrespective of the number of revolutions of its armature. It is often desirable to impose a further limitation on this output dependent on the current output of the machine. To this end I cause the total flux along the working axis 6, 7, of the machine to increase with the current output. Fig. 1 shows that the armature reaction flux 14, which is, of course proportional to the current output, is of same direction as the auxiliary flux 16. I therefore reduce the neutralizing flux 13 in some known manner, for instance, by shunting the neutralizing winding 4 with a resistance, thereby increasing the total flux along the working axis 6, 7 with increasing load and causing the main flux along the axis 9, 11 to diminish with increasing speed and with increasing current output. Should it be desirable for any reason to cause the main flux 17 to increase with the current output then it is only necessary in Fig. 1 to so wind or adjust the neutralizing winding 4 as to make the flux 13 greater than the flux 14.

It should be noted that the resultant flux in the axis 9, 11 is made up of two components. The component 17 due to the winding 8 and the component 15 due to the winding 10, the latter being as a rule quite small because the number of turns on an armature is usually small as compared with an efficient shunt winding, that is one requiring a small exciting current, such as 8. Since the windings 10 and 8 magnetize in the same direction when the connections shown in Fig. 1 are used then the winding 8 could be omitted without altering the direction of the flux along the axis of 8 but this would ordinarily result in an inefficient machine requiring too much exciting current.

As regards commutation in the main axis of Fig. 1 it will be noted that the resultant flux in that axis must always be of the same direction as the armature reaction flux 14 and must therefore tend to impair the commutation at the main brushes. Similarly the flux 17 plus the flux 15 will tend to improve the commutation at the brushes 9, 11. For these reasons it will be generally preferable to so change the connections as to make the direction of the auxiliary flux 16 coincident with that of the neutralizing flux rather than with that of the armature reaction flux 14. This change entails a reversal of the direction of the exciting but not of the working circuit through the armature. This modification is shown in Fig. 2. That figure also shows that the second commuted winding 10 can be dispensed with and that only one auxiliary brush is sufficient. This simplification is made possible by the fact that an E. M. F. exactly equivalent to the E. M. F. ER generated in 10 by rotation of its conductors in 16 is also generated in 5. In order to make use of this equivalent E. M. F. it is therefore only necessary to dispose the brushes 9, 11 or one of them to coact with 5 instead of with 10 and to displace them ninety electrical degrees from the main brushes. In Fig. 2 the armature therefore carries one commuted winding 5 only. The main brushes 6, 7 coacting therewith are connected in series relation with the neutralizing winding 4 and the mains 2, 3. The auxiliary exciting winding 12 is connected in parallel with the mains 2, 3 and the main exciting winding 8 is connected between one of the main brushes 6 and an auxiliary brush 11. The main brushes, the neutralizing winding and the auxiliary exciting winding are coaxial and the main exciting winding and the auxiliary brush are displaced by ninety electrical degrees from the main brushes. The direction of rotation is assumed to be clockwise and the total flux in the main exciting axis is directed as in Fig. 1 but is now due to the flux 17 less that component of 15 which coincides with the axis of 8. The other component of 15 coincides in direction with the main axis and opposes the auxiliary flux. The flux 15 is necessarily small in an efficient machine but should it become unduly large, as may happen in a very small machine, then its demagnetizing effect on the main axis can be easily neutralized. The direction of 15 is displaced from that of 17 because the main exciting current only flows through the armature along the line 6, 11 which is displaced by forty-five electrical degrees from the axis of 8.

The auxiliary flux 16 in Fig. 2 is of opposite direction to the armature reaction flux 14. If it is desired to decompound the machine then the neutralizing flux 13 must be made greater than the reaction flux 14. The E. M. F. responsible for the main flux is now about $\frac{1}{2}$ (E—ER) because only one-half of the total armature conductors are included between the brushes 6 and 11 to which the main exciting winding 8 is connected. The direction of the component E. M. F.'s of E are indicated by dots and crosses placed within the circle 5 representing the commuted winding. The direction of the component E. M. F.'s of ER are indicated by dots and crosses placed without the circle 5. These two sets of dots and crosses clearly indicate that the resultant E. M. F. appearing between the brushes 6 and 11 is truly equal to about $\frac{1}{2}$ (E—ER) as above stated. They also show that if the winding 8 were connected between the brushes 7 and 11 then the main exciting flux would be dependent on $\frac{1}{2}$ (E+ER). The flux 16 in Fig. 2 is of the right direction to improve the commutation at the main brushes and it is only a question of keeping this flux, or generally the resultant flux along the working axis, down to the proper magnitude in the neighborhood of the commutating zone in order to insure perfect commutation. The decompounding flux 13 is of the same direction as 16 and therefore also of the right direction for commutation at the working or main brushes 6, 7. The direction of the resultant flux along the axis of 8 is now of such a direction as to impair the commutation at the auxiliary brush or brushes and should therefore be sufficiently reduced in the neighborhood of the commutating zone in order to permit of good commutation.

The arrangement illustrated in Fig. 3 differs from the previous ones in that the auxiliary flux 16 is not kept practically constant but is caused to increase with increasing speed and independently of the load. This result is secured by including an additive speed E. M. F. in the circuit containing the auxiliary winding 12. While only the E. M. F. E is impressed on 12 in Figs. 1 and 2, in Fig. 3 I impress on 12 an E. M. F. proportional to (E+ER). The actual E. M. F. impressed on 12 in Fig. 3 is about $\frac{1}{2}$ (E+ER) because the winding 12 is connected between the brushes 6 and 9 between which are included only one-half of the armature conductors. This arrangement is therefore characterized by a more rapidly diminishing main flux as compared with the previous arrangement. The direction of the reaction fluxes due to the two exciting currents through the armature conductors is indicated by the arrows 15 and 20. The resistance 18 can be adjusted at 19 and serves to control the number of ampere turns in 4 whereby the characteristic of the machine can be made dependent on the current output to any desired extent and in any desired direction.

In Fig. 4 is shown one way in which the magnetic and electrical circuits diagrammatically indicated in Fig. 3 can be arranged in an actual machine. The armature carrying the two-pole commuted winding 5 is placed in a field structure provided with four mechanical poles each of which carries part of the windings 4, 8 and 12 of Fig. 3. The coils 4 and 12 are so connected as to magnetize from top to bottom while the coils 8 are arranged to magnetize from right to left as indicated by a small arrow in the case of each coil.

The modification shown in Fig. 5 only differs from the arrangement indicated in Fig. 4 in that coils on adjacent poles have been suitably combined. Thus the coil 4 on pole 23 and the coil 4 on pole 22 of Fig. 4 have been replaced by a single coil 4 embracing both mechanical poles and so on. The electromagnetic results are identical.

I am aware that modifications of the machine herein described may be made which fall within the scope of my invention and I do not desire to limit the same otherwise than by the appended claims.

Having fully described my invention what I claim as new and desire to secure by Letters Patent of the United States, is:

1. In a dynamo electric machine, the combination with a revolving member having main brushes and an auxiliary brush displaced therefrom, of means for producing along one axis a magnetization dependent on the terminal E. M. F. of the machine plus an E. M. F. generated by rotation of the commuted winding in said magnetization, and means for producing along another axis a second magnetization dependent on the difference between the terminal E. M. F. and an E. M. F. generated in the commuted winding of rotation in the first magnetization.

2. In a dynamo electric machine, the combination with a revolving member having main brushes and an auxiliary brush displaced therefrom, of means for producing along the axis of the main brushes a magnetization dependent on the terminal E. M. F. of the machine plus an E. M. F. generated by rotation of the commuted winding in said magnetization, and means for producing along another axis a second magnetization depending on the difference between the terminal E. M. F. and an E. M. F. generated in the commuted winding by rotation in the first magnetization.

3. In a dynamo electric machine, the combination with a revolving member having main brushes and an auxiliary brush displaced therefrom, of means for producing along the axis of the main brushes a magnetization dependent on the terminal E. M. F. of the machine plus an E. M. F. generated by rotation of the commuted winding in said magnetization, means for producing along another axis a second magnetization depending on the difference between the terminal E. M. F. and an E. M. F. generated in the commuted winding by rotation in the first magnetization, and means for producing along the axis of the main brushes a magnetization dependent on the current output of the machine.

4. In a dynamo electric machine, the combination with a revolving member provided with main brushes and auxiliary brushes displaced therefrom, of a stationary member having a main exciting winding displaced from the main brushes and connected in series with a main and an auxiliary brush, and an auxiliary exciting winding coaxial with the main brushes and connected in series between a main and an auxiliary brush.

5. In a dynamo electric machine, the combination with a revolving member provided with main brushes and auxiliary brushes displaced therefrom, of a stationary member having a main exciting winding displaced from the main brushes and connected in series with a main and an auxiliary brush, an auxiliary exciting winding coaxial with the main brushes and connected in series between a main and an auxiliary brush said main and auxiliary windings being connected to the same main brush.

6. In a dynamo electric machine, the combination with a revolving member provided with main brushes and auxiliary brushes displaced therefrom, of a stationary member having a main exciting winding displaced from the main brushes and connected in series with a main and an auxiliary brush, an auxiliary exciting winding coaxial with the main brushes and connected in series between a main and an auxiliary brush, said main and auxiliary windings being connected to the same main brush and to separate auxiliary brushes.

7. In a dynamo electric machine, the combination with a revolving member having main brushes and an auxiliary brush displaced therefrom, of means for producing along one axis a magnetization dependent on the terminal E. M. F. of the machine and on an E. M. F. generated by rotation of the commuted winding in said magnetization, and means for producing along another axis a second magnetization dependent on the terminal E. M. F. and on an E. M. F. generated in the commuted winding by rotation in the first magnetization.

In testimony whereof, I have hereunto set my hand and affixed my seal in the presence of the two subscribing witnesses.

VALÈRE ALFRED FYNN. [L. S.]

Witnesses:
   ELIZABETH BAILEY,
   W. A. ALEXANDER.